Patented Dec. 30, 1952

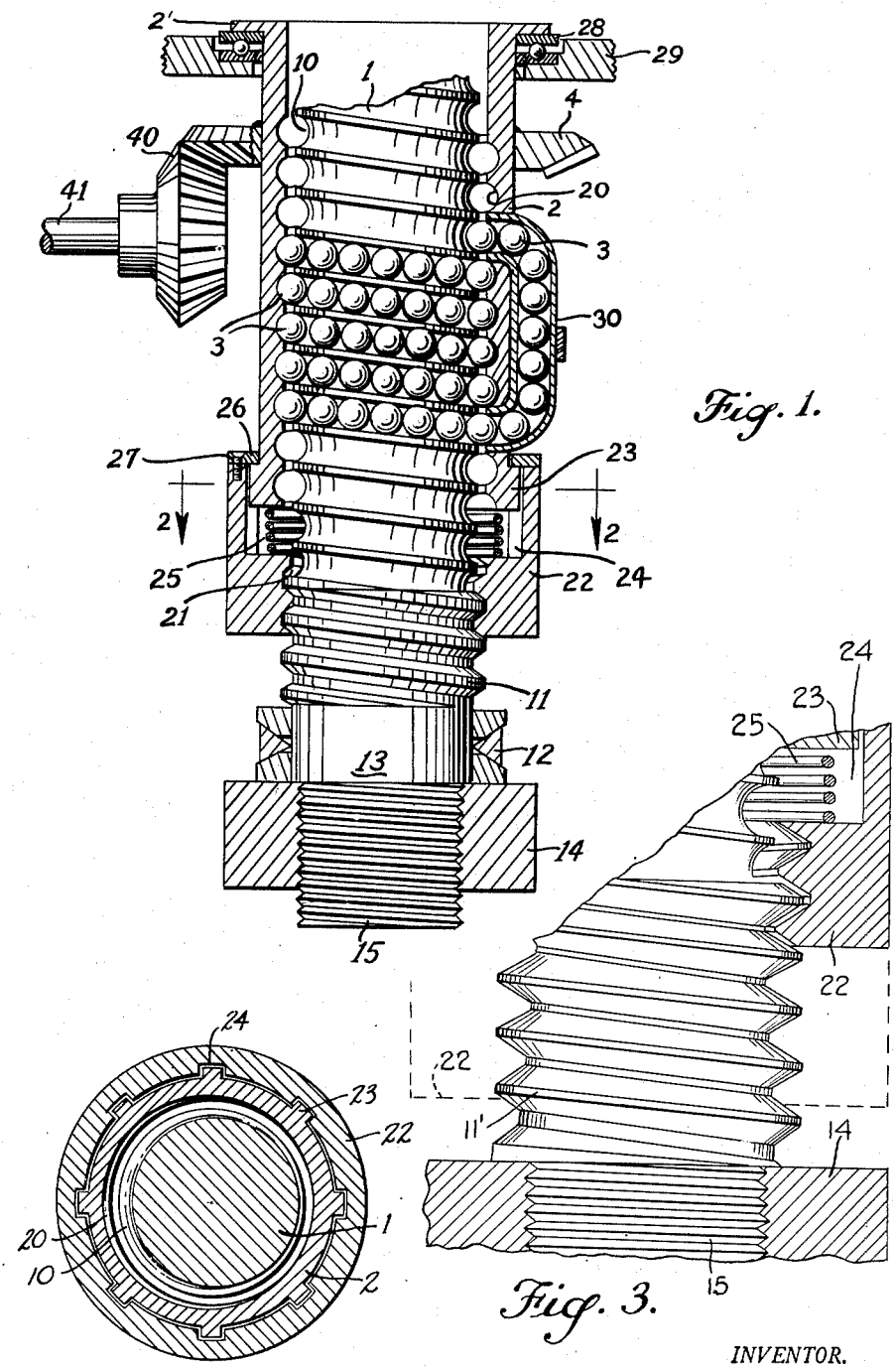

2,623,403

UNITED STATES PATENT OFFICE 2,623,403

BALL-BEARING SCREW RESTRAINING MECHANISM

Frank Terdina, near Seattle, Wash., assignor to Boeing Airplane Company, Seattle, Wash., a corporation of Delaware Application July 12, 1949, Serial No. 104,253

15 Claims. (Cl. 74—424.8)

My invention relates to control mechanism for restraining involuntary operation of antifriction screws, and is particularly applicable to such screws which have a minimum of friction between the parts.

There are several types of antifriction screws; some afford limited relative movement between the screw and nut and others are capable of extended movement. Some such devices have comparatively great friction between the parts by reason of using noncirculating balls interengaged between the screw and nut; others with less friction have recirculating balls interengaged between the screw and nut which are all of the same size; and finally, where alternate large and small recirculating balls are employed to interconnect the screw and nut, as disclosed in Hoffar Patent No. 2,298,011, the friction of the parts is reduced to a minimum. In the more freely movable types of antifriction screw devices, the parts will be rotated relatively by such a slight force as exerted merely by the action of gravity on a part of the screw mechanism when mounted with its axis upright. Where such mechanism is employed to hoist a load, the weight of the load can effect rapid rotation between the screw and nut unless some movement restraining mechanism is used.

The principal object of my invention is to provide simple restraining mechanism for preventing involuntary relative rotation between the screw and nut of antifriction screw and nut mechanism, such as otherwise would be effected by the weight of the parts of such mechanism when mounted with its axis upright, or by the weight of a load adapted to be raised by the antifriction screw and nut mechanism. Particularly it is desired to provide such holding mechanism which will become operative automatically when the screw and nut reach a predetermined relationship, such as one end of the range of their relative movement.

It is a further object to provide mechanism for restraining involuntary rotation of a screw and nut which will be simple in construction and light in weight, as well as being compact. Another object is to control such mechanism so that, during normal operation of the screw and nut device, such holding mechanism will not produce friction or increase the load on the parts whatever, yet in holding position will exert a very substantial resistance to relative rotation of the parts, which ordinarily can be overcome only by voluntarily applying motive power to them.

An advantage of my invention is that it can be applied to antifriction screw and nut devices utilized in various applications with little modification of the antifriction screw and nut installation.

In the drawings a rudimentary antifriction screw and nut device is illustrated merely as an example of a simple form in which the restraining mechanism of my invention may be embodied, but it will be understood that such holding mechanism may be incorporated in a wide variety of antifriction screw installations.

Figure 1 is a longitudinal section through an antifriction screw and nut assembly incorporating my restraining mechanism; and Figure 2 is a transverse section thereof taken on line 2—2 of Figure 1.

Figure 3 is a fragmentary transverse section on an enlarged scale through a modified type of construction.

The antifriction screw and nut mechanism proper, which is not part of my invention, consists of a screw 1 having a helical groove 10 extending about it. The groove bottom preferably is of circular segmental cross section, although it might be of other shape. Encircling this screw is a nut 2 having an internal helical groove 20 of the same pitch as the groove 10 in the screw, and also preferably having a circular segmental cross section. In the grooves 10 and 20 are received balls 3 interconnecting the screw and nut. My invention is particularly applicable to antifriction screw and nut devices in which the balls recirculate through a by-pass from one portion of the screw or nut groove to an axially spaced portion of it, the by-pass 30 shown being in the nut. Between these two portions one or more turns of balls may be lodged in corresponding grooved portions of the screw and nut, or, in fact, only a part of a turn of balls may be interposed between the ends of the by-pass passage.

While an antifriction screw arrangement incorporating a ball circuit having five turns of balls is shown, the structure of the screw and nut being generally like that shown in Hoffar Patent No. 2,298,011, it is desired to emphasize that this form of antifriction screw and nut is purely illustrative and my restraining mechanism hereinafter described can be applied to any of various kinds of antifriction screw devices. As further illustrative, the nut 2 may be rotated by suitable drive mechanism, such as the bevel gear 4 secured to the nut 2, with which meshes the bevel gear 40 driven by the shaft 41, in the mechanism shown in the drawings. In this instance, therefore, it is assumed that the nut 2 will be rotated while held against longitudinal movement, to effect longitudinal, nonrotative reciprocation of screw 1, although my holding mechanism is equally applicable to an installation in which the screw is rotated while being held against axial movement for the purpose of effecting nonrotative translation of the nut 2 along it. In either type of screw and nut device the holding mechanism may be precisely the same.

In essence, the restraining mechanism of my invention includes lands on one of the screw and nut members frictionally engaged in grooves on the other member, and such frictional engagement may be supplemented by the action of resilient pressure means. In the particular embodiment of the holding mechanism shown in the drawings the complemental land and groove construction is formed as interfitting acme threads, the external thread 11 being formed on the screw and the internal thread 21 being formed on the nut. Preferably the lands of the internal thread do not project inward far enough to interfere with the lands on the ball-receiving portion of the screw 1 separating the grooves 10. Because there is very slight clearance between the screw and nut it is probable that the lands of the screw thread 11 will project outward beyond the lands between ball-receiving grooves 20 in the nut 2. While it is stated that the threads 11 and 21 are acme threads, other types of frictionally engageable threads could be employed, such as a square thread or even a V-thread.

It is well known that interfitting solid screw threads produce considerable friction resisting relative rotation of the screw and nut, particularly if one of the members is loaded axially, and if a relatively small amount of friction between the screw and nut is sufficient to hold them against involuntary rotation, the thread portion 11 may merely constitute an extension of the groove 10 in the screw 1, being formed on the same pitch, while the thread 21 on the nut may be formed in continuation of the lands of ball-receiving groove 20 and on the same pitch. If greater friction is required, however, various expedients may be employed to load the screw and nut elements longitudinally to increase the frictional engagement between the solid threads.

As illustrated, the screw 1 is much longer than the nut 2, although the same type of restraining mechanism could be used where the screw is short and cooperates with a long nut. Usually it is desired to provide such holding mechanism at a limiting relationship, the end of relative travel of the parts, and for that reason the interfitting threaded portions of the restraining mechanism are shown on adjacent ends of the screw and nut. A long screw might, however, be provided with a rotation restraining arrangement at any location along its length, either instead of or in addition to the holding structure on the end of the screw. Similarly, if a long nut were employed, holding thread portions could be provided at various locations along its length.

Any of several expedients may be employed to provide substantial frictional engagement between the external and internal solid threads. Such threads may merely be made of relative diameters to fit so tightly that when even short sections of such threads are engaged considerable power will be required to effect relative rotation of the screw and nut. Where the solid threads are located on corresponding ends of the screw and nut one or both of the thread grooves may progressively decrease in depth, like a pipe thread, so that as the extent of the threaded engagement progresses by relative rotation of the nut and screw, the resistance to rotation increases, as likewise will the resistance to reverse rotation. Such a decreasing depth thread structure is shown in Figure 3, in which the nut 22 has a thread with appreciable clearance relative to the corresponding thread adjacent to the ball receiving thread of the screw. This thread, indicated at 11', has a groove decreasing in depth toward the stop nut 14. As the nut 22 turns relative to the screw thread 11', therefore, the fit will become progressively tighter until further rotation of nut 22 relative to the screw will be interrupted. The particular relationship of the screw and nut at the termination of movement will depend upon the relative torque between the screw and nut parts.

In the preferred form of holding mechanism I have provided a construction which will abruptly, rather than gradually, increase the frictional engagement between the external and internal solid thread sections, and to a considerable degree, so that such sections may be made quite short while affording a very substantial restraint on retrograde rotation of the parts. Conversely, the holding action may be relieved by very slight relative rotation of the screw and nut effected by power.

The preferred construction for increasing the friction between the internal and external thread sections 21 and 11 incorporates an attachment to the nut 2 proper in the form of collar 22 on one end of which the internal acme thread section 21 is formed, and in the other end of which is formed a deep cavity receiving the adjacent end of the nut. This attachment collar is operatively connected to the nut for conjoint rotation with it by longitudinal splines 23 on the end of the nut received in the collar cavity, which splines fit in complemental grooves 24 extending longitudinally of the attachment and formed within its nut-receiving cavity, or by equivalent structure such as a sliding key arrangement. The splines 23 are considerably shorter than the grooves 24, so that the attachment collar and nut may slide relatively lengthwise, although these parts are interconnected for rotation in unison.

The attachment collar 22 is urged in one direction longitudinally of the nut 2 by a helical compression spring 25 interengaged between the bottom of its cavity in which the grooves 24 are formed and the end of the nut received in such cavity. Relative extension lengthwise of the collar 22 and nut 2 in response to the force exerted by such spring is limited by the abutment of an internal projection or flange 26 on the end of collar 22 at the entrance to its cavity with a radial projection on the nut, which may be the ends of splines 23. The collar flange preferably is removably mounted on the collar, and may be formed by a ring 27 having screws securing it on the end of the collar. The length of the cavity walls of the collar 22 is such that the flange 26, pressed into abutment with the ends of splines 23 by spring 25, will hold the internal thread section 21 of nut 2 in continuation of the helix defined by its ball groove 20. Also such attachment of the collar to the nut will retain the end of the nut lodged in the cavity of collar 22 in opposition to the action of spring 25 tending to eject it.

If the screw 1 is to be moved lengthwise nonrotatively, the axial thrust on nut 2, produced by such movement of the screw as the nut is rotated, may be transmitted from a flange 2' on the upper end of the nut to a thrust bearing 28 supported in a suitable stationary mounting ring 29. On the contrary, if the screw is power rotated and the nut is reciprocated nonrotatively, the thrust bearing would be omitted and the nut 2 secured directly to the load. In either case any sudden jar on the mechanism as the screw and nut reach the end of their relative movement may be eliminated by the cushioning action of a ring spring assembly 12 encircling a cylindrical portion 13 of the screw 1 at the end of the thread 11. Such spring is composed of interfitting tapered rings and may be held on the screw by a nut 14 screwed onto a reduced threaded end 15 of the screw.

Assuming that the nut 2 is mounted for rotation on the thrust bearing 28 which holds it against axial downward movement, rotation of such nut in the proper direction will move screw 1 longitudinally upward, if it is held against rotation, by interaction of the balls 3 between it and the screw. As the screw approaches the upper limit of its movement ring spring 12 will move lengthwise to engage the end of nut collar 22. The momentum of the screw and continued rotation of nut 2 through a small angle will cause such wedging action of the ring spring parts as to exert a very great resistance to further axial travel of the screw.

Moreover, the pressure of the ring spring 12 against the collar 22 will effect a correspondingly great reacting pressure between the lower sides of the female threads 21 of the collar and the upper sides of the male threads 11 of the screw. Such pressure will produce such a great frictional resistance to relative rotation of the screw and nut as to prevent involuntary reverse relative rotation of them whatever the axial load on them, and will prevent such rotation even by the application of considerable relative torque to them. The parts may be designed to require a predetermined minimum torque to initiate their reverse rotation. As slight upward axial movement of the nut collar is effected by abutment of ring spring 12 with it, it moves longitudinally relative to the nut held against axial movement by reaction of the screw on it. Such small movement of the nut collar longitudinally relative to the nut compresses spring 25.

Because of the great friction thus produced between the thread parts 11 and 21 by the pressure of ring spring 12 against collar 22, axial load on the screw 1 will not involuntarily rotate the nut 2, whereas, as mentioned above, in the absence of such restraint even the weight of the screw alone would cause the nut to rotate involuntarily because of the extremely small friction between the parts resulting from the ball bearing screw arrangement. Because only a very slight relative longitudinal movement between screw 1 and collar 22 is required to produce the large frictional effect described, however, such friction may be removed by a small relative rotation between the screw and nut. As soon as the endwise pressure of ring spring 12 on the collar is relieved, spring 25 will return the nut collar flange 26 into abutment with the ends of the nut splines 23 so that the screw groove 20 and the groove of thread 21 will assume their proper relationship in the same helix. Not only will the friction between the thread parts 11 and 21 thereby be reduced to a minimum, but the lands of the internal thread 21 will be disposed to fit centrally between the lands defining ball grooves 10. The shape and size of the lands of thread 21 will, as shown, be such as to provide adequate clearance to avoid contact between them and any portion of the ball-receiving screw 1.

It will be seen that a ring spring 12 could be utilized to exert frictional pressure between an external thread screw portion 11 and an internal thread screw portion 21 even if the yieldable connection afforded by spring 25 between nut 2 and collar 22 were omitted, such as by forming these two parts integrally. The disadvantage with such an arrangement, however, is that a considerable load would be placed on the balls 3 by the lands between grooves 10 and 20 which would reduce the locking load between the screw threads, and is therefore undesirable. The increase in pressure on these balls effected by compression of spring 25 in the construction shown is sufficiently slight that no appreciable load on the balls is produced, and hence no substantial reduction in locking force on the threads occurs. For this reason the construction described is preferred.

I claim as my invention:

1. Antifriction screw and nut mechanism comprising a screw section and a nut section having cooperating lands disposed in mutual registry, the minimum diameter of the nut section lands exceeding the maximum diameter of the screw section lands, antifriction balls lodged in the complemental helical grooves of and interconnecting said screw and nut sections, frictionally engageable rotation-restraining screw and nut sections, said screw section including screw lands extending substantially in continuation of the helix defined by the lands between convolutions of the ball-receiving screw grooves and having substantially the same pitch and the lands of the rotation-restraining nut section extending substantially in continuation of the helix defined by the ball-receiving groove of the ball-receiving nut section, the minimum diameter of such rotation-restraining nut section lands being substantially smaller than the maximum diameter of the rotation-restraining screw section lands and spring means operable to react between said frictionally engageable screw and nut sections and increase the pressure therebetween in a direction longitudinally of said screw and nut sections.

2. The mechanism defined in claim 1, in which the threads of the frictionally engageable rotation-restraining screw and nut sections are of the acme thread type.

3. The mechanism defined in claim 1, in which the root diameter of the thread of the frictionally engageable screw section is greater than the root diameter of the groove of the ball-receiving screw section.

4. Antifriction screw and nut mechanism comprising a screw member having an external helical ball-receiving groove, a nut member having an internal helical ball-receiving groove of the same pitch and complemental to the ball-receiving groove of said screw, a plurality of antifriction balls lodged in the grooves of the screw and nut and thereby interconnecting the screw and nut, a screw thread on one of said members including a groove smaller than the ball-receiving groove of such member, and means carried by the other of said members normally disengaged from said screw thread and frictionally engageable with said screw thread by relative longitudinal movement of said screw and nut members for restraining involuntary relative rotation of said members.

5. Antifriction screw and nut mechanism comprising a screw having an external helical ball-receiving groove and, in substantially a continuation of the helix defined by the lands between convolutions of such groove, an external screw thread of substantially the same pitch as such ball-receiving groove but including a narrower groove, a nut having an internal ball-receiving groove of the same pitch and complemental to the ball-receiving groove of said screw, a plurality of antifriction balls lodged in the grooves of the screw and nut and thereby interconnecting the screw and nut, a nut collar having an internal screw thread complemental to the screw thread on said screw and frictionally engageable therewith, and means interconnecting said nut and nut collar for conjoint rotation.

6. Antifriction screw and nut mechanism comprising a screw having an external helical ball-receiving groove and, in substantially a continuation of the helix defined by the lands between convolutions of such groove, an external screw thread of substantially the same pitch as such ball-receiving groove but including a narrower groove, a nut having an internal ball-receiving groove of the same pitch and complemental to the ball-receiving groove of said screw, a plurality of antifriction balls lodged in the grooves of the screw and nut and thereby interconnecting the screw and nut, a nut collar having an internal screw thread complemental to the screw thread on said screw and frictionally engageable therewith, and means interconnecting said nut and nut collar for conjoint rotation, guiding them for relative longitudinal movement, and normally retaining said nut and nut collar to dispose the lands between convolutions of the nut ball-receiving groove substantially in the same helix as the screw threads of said nut collar, but yieldable to enable relative longitudinal movement between said nut and nut collar upon frictional engagement of said screw and nut screw threads to prevent binding of said balls between the ball-receiving grooves of the screw and nut.

7. Antifriction screw and nut mechanism comprising a screw having an external, helical, ball-receiving groove and in continuation of the lands between convolutions thereof an external screw thread of substantially the same pitch as the ball-receiving groove, a nut having an internal helical ball-receiving groove of the same pitch and complemental to the ball-receiving groove of said screw, a plurality of antifriction balls lodged in the grooves of the screw and nut and thereby interconnecting the screw and nut, a nut collar having in one end thereof an internal screw thread complemental to the screw thread on said screw and frictionally engageable therewith, means interconnecting said nut and nut collar for conjoint rotation and guiding them for relative longitudinal movement, resilient means interengaged between said nut and said nut collar and urging said nut in a direction to withdraw its end from said nut collar cavity, means limiting relative separating longitudinal movement of said nut and nut collar to dispose the nut collar thread in substantially the same helix as the lands between convolutions of the nut's ball-receiving groove, and resilient means engageable with said screw and said nut collar by relative longitudinal movement of said nut collar and said screw effecting engagement of said screw threads to press the screw threads on said screw and nut collar resiliently together into firm frictional engagement for restraining involuntary relative rotation of said screw and nut.

8. Antifriction screw and nut mechanism comprising a screw having an external, helical, ball-receiving groove and in continuation of the lands between convolutions thereof an external screw thread of substantially the same pitch as the ball-receiving groove, a nut having an internal helical ball-receiving groove of the same pitch and complemental to the ball-receiving groove of said screw, a plurality of antifriction balls lodged in the grooves of the screw and nut and thereby interconnecting the screw and nut, a nut collar having in one end thereof an internal screw thread complemental to the screw thread on said screw and frictionally engageable therewith and in its other end a cavity receiving an end of said nut, means interconnecting said nut and nut collar for conjoint rotation and guiding them for relative longitudinal movement, resilient means interengaged between said nut and said nut collar and urging said nut in a direction to withdraw its end from said nut collar cavity, means limiting relative separating longitudinal movement of said nut and nut collar to dispose the nut collar thread in substantially the same helix as the lands between convolutions of the nut's ball-receiving groove, means carried by said screw and projecting radially therefrom to form a shoulder, and a ring spring encircling said screw, bearing against the shoulder formed by said projecting means and engageable with said nut collar by relative longitudinal movement of said nut collar and said screw effecting engagement of said screw threads to press the screw threads on said screw and nut collar resiliently together into firm frictional engagement for restraining involuntary relative rotation of said screw and nut.

9. Antifriction screw and nut mechanism comprising a screw having an external helical ball-receiving groove and in continuation of the lands between convolutions thereof an external screw thread of substantially the same pitch as the ball-receiving groove, a nut having an internal helical ball-receiving groove of the same pitch and complemental to the ball-receiving groove of said screw, splines on one end of said nut, a plurality of antifriction balls lodged in the grooves of the screw and nut and thereby interconnecting the screw and nut, a nut collar having in one end thereof an internal screw thread complemental to the screw thread on said screw and frictionally engageable therewith and in its other end a cavity receiving the splined end of said nut and grooved longitudinally to fit said splines for preventing relative rotation of said nut and nut collar and guiding them for relative longitudinal movement, a ring removably secured to the cavity end of said nut collar and defining a flange extending inwardly for axial abutment with the ends of said nut splines remote from the end of the nut to limit relative extension longitudinal movement of said nut and nut collar to dispose the nut collar thread in substantially the same helix as the lands between convolutions of the nut's ball-receiving groove, a helical compression spring interposed between the bottom of the nut collar cavity and the end of said nut, normally urging them into extended relationship to dispose said ring flange and the end of said nut splines in abutment, and means interposed between said screw and said nut collar engageable therewith by relative longitudinal movement thereof effecting engagement of said screw threads to exert a force between said screw and said nut collar to press together the screw threads on the screw and nut collar into firm frictional engagement for restraining involuntary relative rotation of said screw and nut.

10. Antifriction screw and nut mechanism comprising a screw having an external helical ball-receiving groove and in continuation of the lands between convolutions thereof an external screw thread of substantially the same pitch as the ball-receiving groove, a nut having an internal helical ball-receiving groove of the same pitch and complemental to the ball-receiving groove of said screws, splines on one end of said nut, a plurality of antifriction balls lodged in the grooves of the screw and nut and thereby interconnecting the screw and nut, a nut collar having in one end thereof an internal screw thread complemental to the screw thread on said screw and frictionally engageable therewith and in its other end a cavity receiving the splined end of said nut and grooved longitudinally to fit said splines for preventing relative rotation of said nut and nut collar and guiding them for relative axial movement, a ring removably secured to the cavity end of said nut collar and defining a flange extending inwardly for axial abutment with the ends of said nut splines remote from the end of the nut to limit relative extension axial movement of said nut and nut collar to dispose the nut collar thread in substantially the same helix as the lands between convolutions of the nut's ball-receiving groove, a helical compression spring interposed between the bottom of the nut collar cavity and the end of said nut, normally urging them into extended relationship to dispose said ring flange and the end of such nut splines in abutment, and resilient means interposed between said screw and nut collar engageable therewith by relative axial movement thereof effecting engagement of said screw threads to exert a force between said screw and said nut collar to press together the screw threads on the screw and nut collar into firm frictional engagement for restraining involuntary relative rotation of said screw and nut.

11. Antifriction screw and nut mechanism comprising grooved screw and nut members, a plurality of antifriction balls engaged between said members, lodged in the grooves thereof, means carried by one of said members normally disengaged from the other of said members, but frictionally engageable in the groove of such other member by relative longitudinal movement of said screw and nut members for restraining involuntary relative rotation of said member, and means operable to react between said first means and such other of said members and effect such relative longitudinal movement thereof.

12. The antifriction screw and nut mechanism defined in claim 11, in which the first means is a screw thread engageable in the groove of such other member.

13. Restraining mechanism for a screw and nut having antifriction balls lodged in the complemental helical grooves of a ball-receiving groove screw section and a ball-receiving groove nut section and interconnecting the screw and nut, comprising frictionally engageable screw and nut sections having interengageable threads of substantially the same pitch as such ball-receiving grooves, means operatively connecting said frictionally engageable screw section and the ball-receiving groove screw section and preventing relative rotation thereof, means operatively connecting said frictionally engageable nut section and the ball-receiving groove nut section and preventing relative rotation thereof, and resilient means carried by one of said frictionally engageable sections and engageable with the other of said frictionally engageable sections by relative longitudinal movement of said frictionally engageable screw and nut sections to exert a force therebetween tending to move them relatively longitudinally to press together the interengageable threads thereon.

14. The restraining mechanism defined in claim 13, in which the resilient means includes a ring spring carried by the screw section concentrically therewith and engageable with the nut section by relative longitudinal movement of the screw and nut sections, upon such engagement to exert a force between such sections.

15. The restraining mechanism defined in claim 13, in which the ball-receiving groove nut section and the frictionally engageable nut section are relatively shiftable longitudinally, and a spring interengaged between such two nut sections and tending to effect relative longitudinal movement thereof.

FRANK TERDINA.

REFERENCES CITED

The following references are of record in the file of this patent:

UNITED STATES PATENTS

| Number | Name | Date |
| --- | --- | --- |
| 1,369,346 | Mazooco | Feb. 22, 1921 |
| 1,810,910 | Esmond | June 23, 1931 |
| 1,874,491 | Fritsch | Aug. 30, 1932 |
| 2,444,886 | Vickers | July 6, 1948 |
| 2,447,439 | Thompson | Aug. 17, 1948 |